UNITED STATES PATENT OFFICE.

JOSEPH DAVIS, OF BOSTON, MASSACHUSETTS.

PURIFYING AND BLEACHING FATS AND FATTY OILS.

SPECIFICATION forming part of Letters Patent No. 306,324, dated October 7, 1884.

Application filed March 12, 1884. (No specimens.)

*To all whom it may concern:*

Be it known that I, JOSEPH DAVIS, of Boston, in the county of Suffolk and State of Massachusetts, have invented an Improved Process of Purifying and Bleaching Fats and Fatty Oils; and I hereby declare that the following is a full, clear, and exact description of the same.

My present invention has special reference to processes for refining and bleaching fats and fatty oils, set forth in Patents of the United States Nos. 156,404 and 216,558. The treatment of various oleaginous matter in the manner therein described produces good results, but fails to remove all of the objectionable properties.

To still further purify and bleach the same is the object of my present invention, which consists in the employment of bichromate salts, permanganate salts, and neutral chromate salts, properly combined, as an effective disintegrating or separating agent, whereby the coloring, mucilaginous, albuminous, fibrous, and decomposed matters are entirely removed, and the odor of the oil or fats rendered sweet, as desired.

To enable others skilled in the art to understand and apply my process, I will proceed to describe the manner in which I have carried it out.

I first fuse together in an iron pot or pan the following ingredients, in about the proportions named: Ten (10) pounds of caustic soda or its equivalent in caustic potash, and seven (7) pounds of chlorate of potash. After fusion add in small quantities at various times eight (8) pounds of the fine powder of black oxide of manganese. After the above are thoroughly incorporated I add twenty-five (25) pounds of the bichromate of potash, and while increasing the heat stir well until the fusion and firmness of the mass are complete.

To subject the fats or fatty oils to treatment, I use the following-described mixture: Two (2) ounces of the foregoing chemical salts dissolved in one-half (½) of a gallon of hot water, agitate the same with seven and one-half (7½) pounds of melted fat or oil. Then add thereto six (6) fluid-ounces of diluted sulphuric acid, and continue the agitation and boil with live steam until the mixture becomes thorough and complete. Then allow the mixture to settle, after which draw off the chemical water. Then wash with water, and finally wash by agitation with a light solution of carbonate of soda. When settled, draw off and wash with water and live steam. The oil or fat is then ready for use.

My product may be distinctly recognized by a chemist who is versed in the examination of oil by its freedom from mucilaginous matter and the products of decomposition of fatty matter, which I have not before succeeded in removing entirely by any other process; and it may also be identified by the absence of the chemicals used to bleach and refine it, which it has hitherto been impossible to eliminate entirely. Such bodies, of which traces have remained behind in my former products, are, first, manganic acid and the binoxide of manganese, which are the products of the reaction of the mucilaginous matter with the permanganate salt used; and, second, the green oxide of chromium, which is the product of the reaction of the mucilaginous matter with the bichromate.

I claim—

1. As an improvement in the process of treating fatty matter, a mixture consisting of bichromate salts, permanganate salts, and neutral chromate salts, for bleaching and facilitating the separation of the impurities from the oleaginous mass, substantially as described.

2. As a new article of manufacture, a deodorized fat, tallow, oil, or oleaginous matter derived as a product from the treatment of the same by the use of bichromate salts, permanganate salts, chromate salts, and sulphuric acid, substantially as described.

3. As a new article of manufacture, fats, tallow, oil, or other oleaginous matter having eliminated therefrom all foreign substances—such as albuminous, mucilaginous, fibrous, and coloring matter—by the use of bichromate salts, permanganate salts, chromate salts, and sulphuric acid, substantially as set forth.

Witness my hand this 6th day of March, 1884.

JOSEPH DAVIS.

In presence of—
 N. W. STEARNS,
 JAS. W. CHAPMAN.